(12) United States Patent
Salour et al.

(10) Patent No.: US 12,387,209 B2
(45) Date of Patent: Aug. 12, 2025

(54) SECURE COMMUNICATION BETWEEN ORGANIZATIONS TO PROTECT DATA

(71) Applicant: THE BOEING COMPANY, Arlington, VA (US)

(72) Inventors: Ali Salour, Fenton, MO (US); Gregory V. Robinson, O'Fallon, MO (US); Timothy S. Dunlevy, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 162 days.

(21) Appl. No.: 18/323,993

(22) Filed: May 25, 2023

(65) Prior Publication Data

US 2024/0394701 A1    Nov. 28, 2024

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
CPC ........................... G06Q 20/401; G06Q 20/389
USPC ...................................................... 705/35–45
See application file for complete search history.

(56) References Cited

U.S. PATENT DOCUMENTS

| | | | |
|---|---|---|---|
| 2019/0205563 A1* | 7/2019 | Gonzales, Jr. | ............ H04L 9/30 |
| 2020/0019680 A1* | 1/2020 | Frederick | ................ G06F 21/31 |
| 2020/0167770 A1* | 5/2020 | Kurian | ................ G06Q 20/065 |
| 2024/0394701 A1* | 11/2024 | Salour | .................... G06Q 30/06 |

* cited by examiner

*Primary Examiner* — Robert R Niquette
(74) *Attorney, Agent, or Firm* — Harrity & Harrity, LLP

(57) ABSTRACT

The present disclosure relates to securing communication between two organizations (e.g., a purchaser and a third-party supplier) to protect the data for both organizations and to maintain confidentiality. The embodiments herein permit the organizations to keep their sensitive data on their own networks but still share sufficient data to perform simulations and determine interoperability between components, parts, and systems. In one aspect, the organizations have access to a shared blockchain (e.g., a ledger) that permits the organizations to establish smart contracts for testing components, parts, and systems. The smart contracts can include code for spinning up agents that execute in the organizations' networks. These agents can then, according to the defined parameters of the smart contract, share and retrieve data on the blockchain so that the test can be performed.

20 Claims, 11 Drawing Sheets

SECURE COMMUNICATION BETWEEN ORGANIZATIONS TO PROTECT DATA

FIELD

Aspects of the present disclosure relate to secure communication between two organizations (e.g., a supplier and a purchaser).

BACKGROUND

In current practices, when engineering data is passed from a manufacturer to a third-party supplier (e.g., an original equipment manufacturer (OEM)), it is no longer tightly controlled and the supplier can internally share the data without any restrictions. Furthermore, the identity of the users accessing the data is no longer visible to the manufacturer since the manufacturer typically does not have visibility into the supplier's network. The existing solutions involve model exchanges, mock-up designs, and other non-standard solutions.

Likewise, the suppliers may have design authority, as they may have their own intellectual property they would like to protect when exchanging information with the manufacturer. However, exchange of sensitive data is required in many cases to, for example, ensure interoperability between two or more systems, when physically mating two structures, and the like. Current solutions do not permit secure communication to ensure a supplier's part or component can satisfy the collaboration or purchaser's requirement while also protecting both the purchaser's and the supplier's intellectual property and preventing data breaches.

SUMMARY

The present disclosure provides a method, system, or computer-readable medium in one aspect, the method, system, or computer-readable medium including: creating an agent based on a smart contract, wherein the smart contract defines a task for the agent to perform on behalf of at least two organizations, wherein at least one of the organizations is a supplier or a purchaser, identifying a data set to perform the task using a file directory on a blockchain, wherein the blockchain is shared between the two organizations, retrieving the data set using at least one of the blockchain or local storage on a same network as the agent, performing the task by the agent using the data set, posting, by the agent, results of performing the task, or a location of the results, on the blockchain, and destroying the agent In one aspect, in combination with any example method, system, or computer-readable medium above or below, the method, system, or computer-readable medium includes creating a project contract defining the task where the project contract is negotiated by the two organizations and indicates the data required by both of the two organizations to complete the task, and where the smart contract is generated using the project contract and comprises software code for the agent.

In combination with any example method, system, or computer-readable medium above or below, the method, system, or computer-readable medium includes wherein the purchaser provides simulation code to the agent and the supplier provides a model to the agent, wherein performing the task includes executing, by the agent, the simulation code using the model as an input.

In combination with the method, system, or computer-readable medium above, the method, system, or computer-readable medium includes where the simulation code and the model are encrypted. The method, system, or computer-readable medium further includes providing keys to the agent using a second blockchain to decrypt the simulation code and the model.

In combination with the method, system, or computer-readable medium above, the results of performing the task are encrypted. Further, the method, system, or computer-readable medium includes providing a key to the two organizations for decrypting the results using the second blockchain.

In combination with the method, system, or computer-readable medium above, the method, system, or computer-readable medium includes upon determining the model failed the simulation code, determining at least one dependent model impacted by the failure and posting a notification event to an owner of the at least one dependent model.

In combination with any example method, system, or computer-readable medium above or below, retrieving the data set further comprises retrieving a first portion of the data set, or a location of the first portion of the data set, from the blockchain that was posted by a second agent executing on a network of a first one of the two organizations and retrieving a second portion of the data set from local storage that is part of a same network as the agent.

In one aspect, in combination with any example method, system, or computer-readable medium above or below, the agent executes in an execution environment that is shared by the supplier and the purchaser.

In one aspect, in combination with any example method, system, or computer-readable medium above, the agent is part of a network of one of the supplier or the purchaser and is not able to access a network of the other organization.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to securing communication between two or more organizations (e.g., a manufacturer and a third-party supplier) to protect the data for the organizations and to maintain confidentiality. For example, a manufacturer may have requested the third-party supplier to design a part that mates with another part designed by the manufacturer. The manufacturer may want to run a simulation to determine whether the two parts mate successfully and have the desired functionality. While the manufacturer or the third-party supplier (or both) could send the engineering models so that the simulation could be performed, the organization sending the engineering models loses controls of these highly-sensitive documents. The organization does not know if the other party will protect the data or who they may share the data with.

The techniques described herein permit the organizations to keep their sensitive data on their own networks but still share sufficient data to perform simulations and determine interoperability between components, parts, and systems. In one aspect, the organizations have access to a shared blockchain (e.g., a ledger) that permits the organizations to establish smart contracts for testing components, parts, and systems. The smart contracts can include code for spinning up agents that execute in the organizations' networks. These agents can then, according to the defined parameters of the smart contract, share and retrieve data on the blockchain so that the test can be performed. Instead of sharing the sensitive engineering models, the organizations can share data points needed to perform the test (e.g., a simulation) on the blockchain which means the other organization does not receive the engineering models. The results of the test can then be placed on the blockchain so it can be seen by both organizations (in case changes need to be made). Once the test has been performed, the agent may be destroyed which further reduces the chance of a data breach.

In one aspect, the testing can be performed by an agent in one of the organizations' networks. For example, the smart contract can indicate which network should perform the test and then provide instructions for another agent on the other organization's network to provide any necessary data to the blockchain so it can be retrieved and used to execute the test. In another aspect, the test may be performed in a secure, shared execution environment (e.g., a cloud provider). The shared execution environment can execute an agent that accesses, using the blockchain, the data required to perform the test from agents executing in the organizations' networks. The agent in the shared execution environment can then post the results and a proof of the evidence of the test to the blockchain so that both organizations can access and verify the results.

Figure 1:
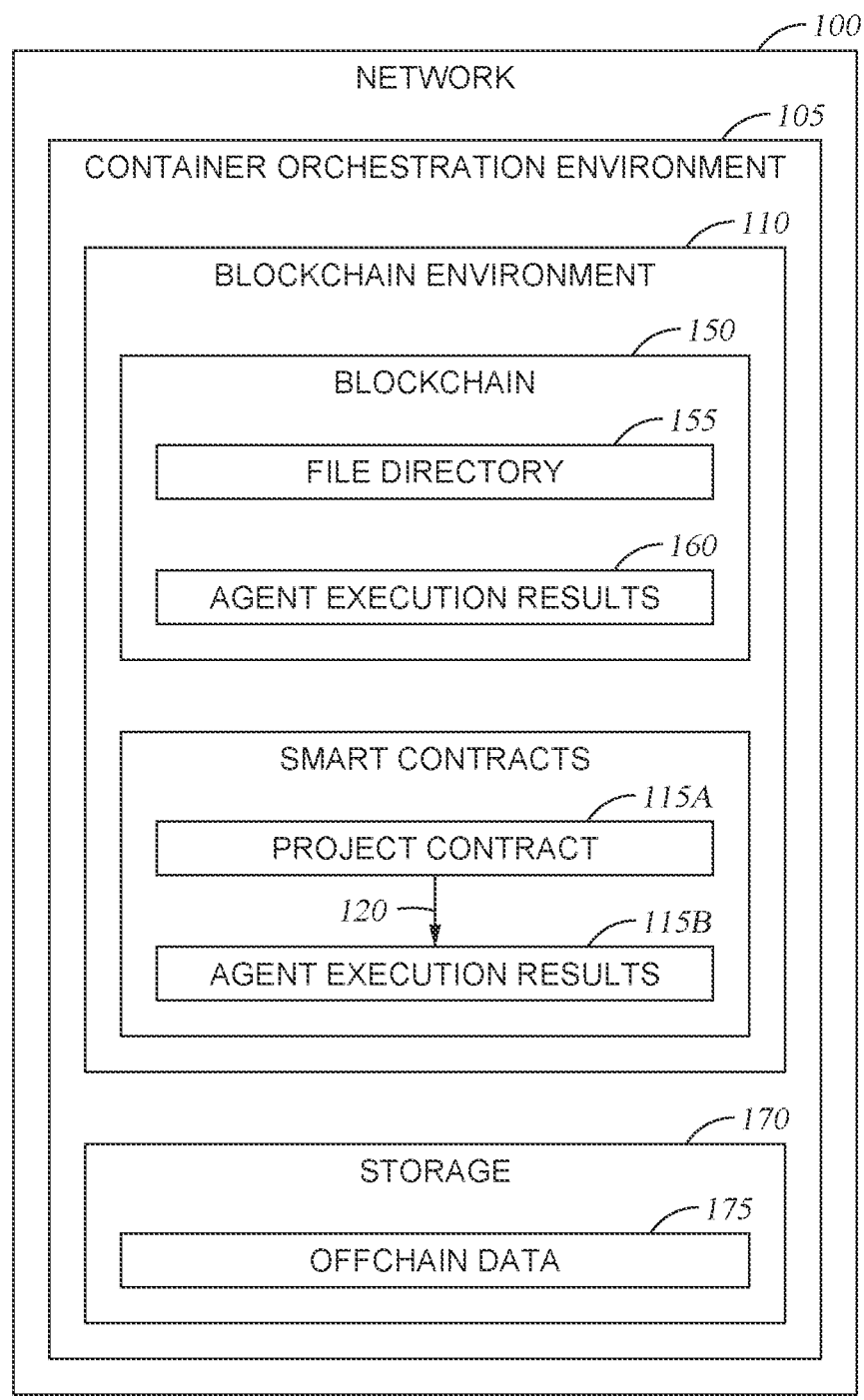
FIG. 1 depicts an organization network to facilitate secure communication with another organization, according to one aspect.

FIG. 1 depicts an organization network 100 to facilitate secure communication with another organization, according to one aspect. The network 100 may be a secure network for the organization (e.g., a manufacturer, purchaser, or supplier). As such, the network 100 may prohibit or limit access from external persons or entities.

The network 100 includes a container orchestration environment 105 that includes a blockchain environment 110 and storage 170. The blockchain environment 110 in turn includes smart contracts 115 and a blockchain 150 (or ledger). In this example, the smart contracts include two contracts: a project contract 115A and an agent code execution contract 115B. In one aspect, two or more organizations negotiate to establish the project contract 115A. The project contract 115A can establish the parameters of a test or task that uses data from the organizations (e.g., a simulation or test using engineering data or models from the organizations). In one aspect, the project or task uses protected off-chain data (e.g., data that is not on the blockchain 150) from multiple organizations that is stored only on those companies' local networks (e.g., the network 100). Put differently, the project contract 115A can indicate what data is needed from all the organizations in order to complete the project (e.g., run a simulation on the physical mating of two components, or the interoperability of two electrical systems, etc.).

The arrow 120 indicates that the parameters and information in the project contract 115A (which was agreed upon by the organizations) are used to establish the agent code execution contract 115B. The contract 115B defines code (e.g., software code) for establishing an agent in the network 100 to perform the project or task. As will be discussed later, the networks for each the organizations involved in the project may spin up their own agent using the agent code execution contract 115B. The respective agents may perform different tasks depending on the parameters in the project contract 115A. The agents will be discussed in more detail in the figures that follow.

The blockchain 150 stores a file directory 155 and agent execution results 160. In one aspect, the file directory 155 is an off-chain file directory that provides the location of files that are part of the project contract 115A (e.g., the files of interest) but are not located on the blockchain 150. For example, the file directory 155 can indicate locations of off-chain data 175 stored in the storage 170 that are part of the project or task. Thus, any agent on the network 100 can use the file directory 155 to identify off-chain data 175 in the same network (or the same organization) that is used to execute the project or task.

The agent execution results 160 represents results for executing projects that have been uploaded onto the blockchain 150. Because the blockchain 150 is viewable to each organization, the organizations may view the results 160. However, the results 160 can also be encrypted. Thus, an organization that was not part of the project (e.g., not part of the project contract 115A) may not be able to access the results 160. For example, the blockchain 150 may be shared by multiple organizations, but only a subset of those organizations may participate in the project. The results 160 can be encrypted and the key can be provided to only the subset of organizations that participated in the project so only those organizations can access the results 160. The organizations can then use the results to take an action. For example, if the results 160 indicate the test was successfully (e.g., the parts mate successfully or the two system interoperate as desired), the parts or systems can be verified. However, if there were problems, the organizations can then edit or revise their engineering models. Another project contract 115A can then be negotiated to re-run the test or simulation using updated models.

Figure 2:
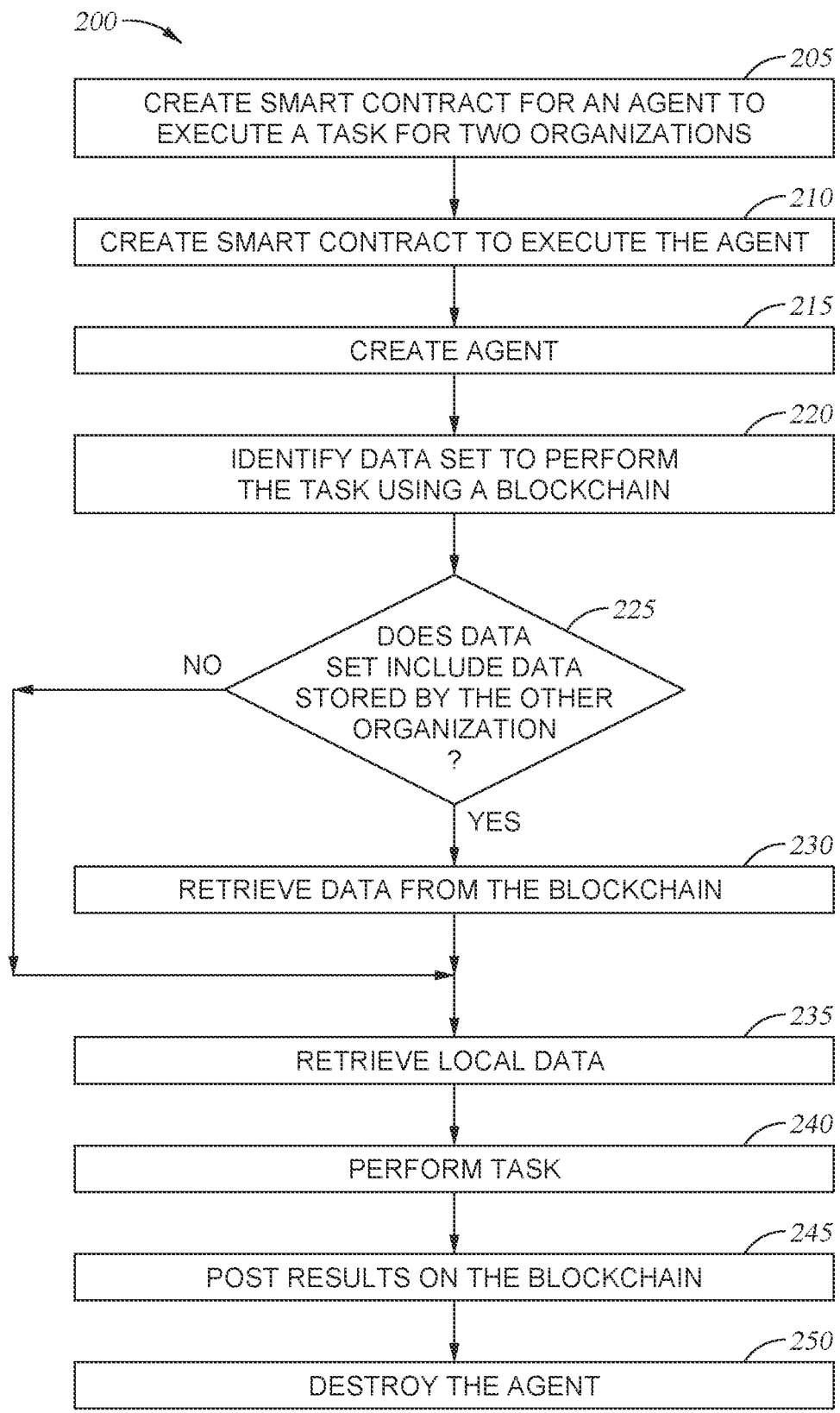
FIG. 2 is a flowchart for enabling secure communication between two organizations using an agent, according to one aspect.

FIG. 2 is a flowchart of a method 200 for enabling secure communication between two organizations using an agent, according to one aspect. For clarity, many of the blocks in the method 200 are discussed in tandem with FIGS. 3A-3F which illustrate performing a test using an agent, according to one aspect.

At block 205, the organizations create a smart contract for an agent to execute a task for the organizations. Although the aspects described herein describe a contract between two organizations, there can be any number of organizations participating in the task. For example, the task may be to simulate the performance of a wing of an aircraft where multiple parts of the wing are generated by different organizations (e.g., different third-party suppliers). The method 200 can be used to simulate the performance of the wing using parts designed by two, three, four, or more different suppliers.

Figure 3A:
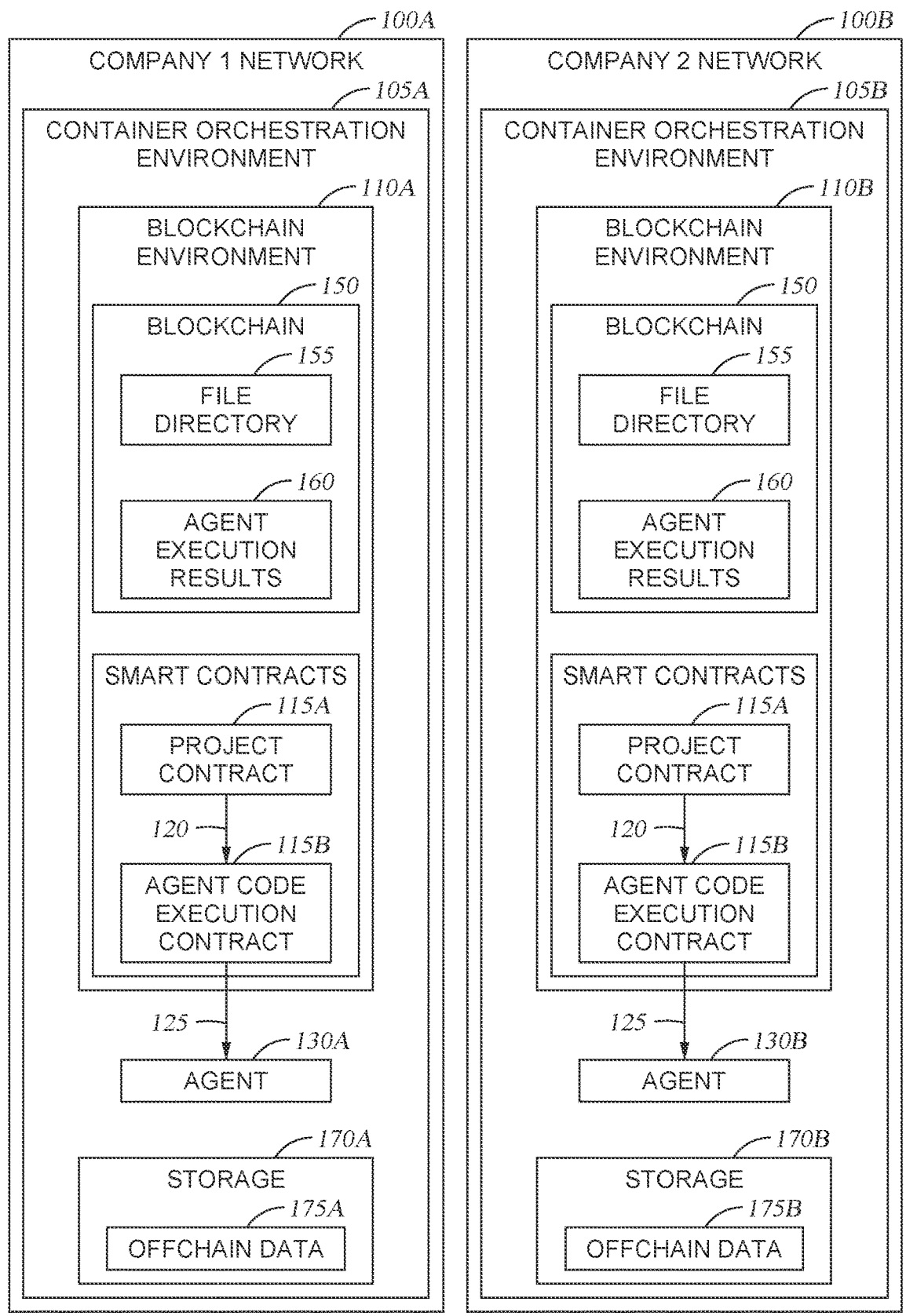
FIGS. 3A-3F illustrate performing a test using an agent, according to one aspect.

In one aspect, the smart contract created at block 205 is the project contract 115A shown in FIG. 3A and discussed in FIG. 1. FIG. 3A illustrates two networks 100A and 100B for two different organizations. Notable, both of the networks 100 includes a container orchestration environment 105A and 105B that stores the same smart contracts 115 and the blockchain 150. That is, the same contracts 115 and the blockchain 150 are shared by the organizations. Thus, the organizations have access to the data stored in the blockchain 150, although this data may be encrypted so only certain organizations can decrypt the data.

The multiple organizations can negotiate to establish the project contract 115A. The project contract 115A can establish the parameters of a task that uses data from the organizations (e.g., a simulation or test using engineering data or models from the organizations). In one aspect, the project or task uses protected off-chain data (e.g., data that is not on the blockchain 150) from multiple organizations that is stored only on those companies local networks (e.g., the network 100). Put differently, the project contract 115A can indicate what data is needed from each the organizations in order to complete the project (e.g., run a simulation on the physical mating of components, or the interoperability of mating electrical systems, etc.).

At block 210, the networks create a smart contract to execute the agent. In one aspect, the smart contract is the agent code execution contract 115B shown in FIG. 3A which was generated using the project contract 115A as shown by the arrow 120. This can be performed by both of the networks 100A and 100B. As discussed above, the agent code execution contract 115B can include code for spinning up an agent to perform the desired task. In one aspect, the agent code execution contract 115B can specify the tasks that should be performed by the networks 100 to complete the tasks. However, in an alternative aspect, the project contract 115A may create an agent code execution contract 115B that indicates the actions the agent executing on the network 100A should perform and another agent code execution contract 115B that indicates the actions the agent executing on the network 100B should perform, which may be different actions from what should be performed by the agent on the network 100A. In other words, the agent code execution contract 115B may spin up the same agents in the networks 100A and 100B, or may have code to create customized agents in the networks 100A and 100B.

At block 215, the network creates the agent using the agent code execution contract. This is shown by the arrows 125 in FIG. 3A. As a result, the network 100A includes the agent 130A and the network 100B has the agent 130B. While FIGS. 3A-3F illustrate generating agents in both networks 100A and 100B, in some testing situations, only one agent may be used.

In one aspect, the agents 130 execute within a container—i.e., are containerized. The agent code execution contract can generate the container for the agent and then pass the agent code into the container for execution by the container. This can enhance the security of the agents 130. Further, the agents 130 may not have an application programming interface (API) or any other interface that permits a user (internal to the network 100 or external to the network) from logging in and accessing the agent 130. As discussed below, the agents 130 may perform the task, save the results on the blockchain, and then be destroyed, without their containers being accessible to a human user.

At block 220, the agent identifies a data set to perform the task using the blockchain. In one aspect, the task requires data from both organizations. Although not shown in figures, the agents 130 may identify data that is required to perform the task and preemptively store this data (or a location of this data) on the blockchain 150. However, as discussed above, the organizations may not want to share their entire engineering models or other sensitive information with the other organizations. Instead, the project contract can indicate what data is needed to perform the task. For example, to run a simulation, the simulator may not need the entire engineering model, but may only need data generated by the model (e.g., data points). This data can be shared without exposing the underlying engineering model. As such, the project contract can indicate the data that will be shared (which the organizations agreed to) and then the agent code execution contract can spin up the agents 130 that retrieve this data and store it on the blockchain 150. Further, this data can be encrypted so that organizations that share the blockchain 150 but are not part of the current smart contract cannot decrypt the data or the location of the data.

At block 225, the agent determines whether the data set includes data stored by other organizations. Put differently, the agent for each organization can determine whether it needs data from other organizations in order to perform the task. If so, the method 200 proceeds to block 230 where the agent retrieves that data (or a location of this data) from the blockchain. That is, prior to block 230, the agent for the other organization will have loaded the data (or its location) onto the blockchain so it is ready to be retrieved at block 230.

However, other tasks may not require the organizations to share data, in which case the method 200 may skip block 230. For example, rather than mating two components, one organization may be designing an independent component or system that does not interoperate with other systems in the overall product. In that case, the purchaser may simply provide a design specification or desired functions in the project contract. The agent executing on the supplier's network can then run a simulation using its local data to determine whether the component or system meets the design specification or desired functions. In that case, the purchaser does not need to provide data regarding its own components to the agent executing on the supplier's network since the supplier agent can retrieve the design specification from the project contract 115A stores in its blockchain environment 110B.

At block 235, the agent retrieves local data for performing the task. As shown by the arrows 145 in FIG. 3B, the agents 130 access the off-chain file directory 155 in the blockchain 150 to identify the location of off-chain data (e.g., local data) needed to perform the task. In one aspect, the agent 130 can use an organization certificate that has full access to the data on the blockchain 150 to determine the location of the files of interest.

Figure 3B:
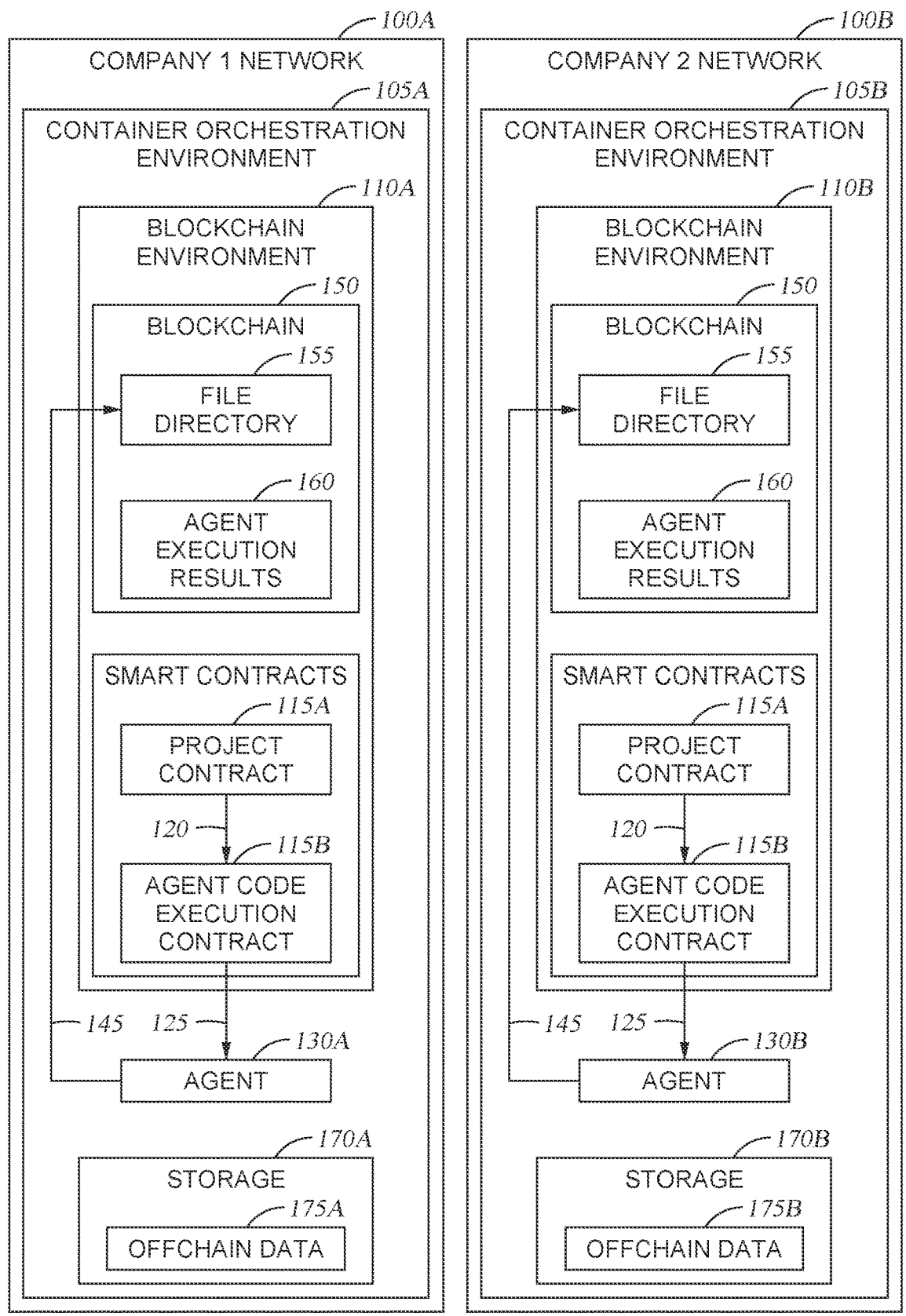
Figure 3C:
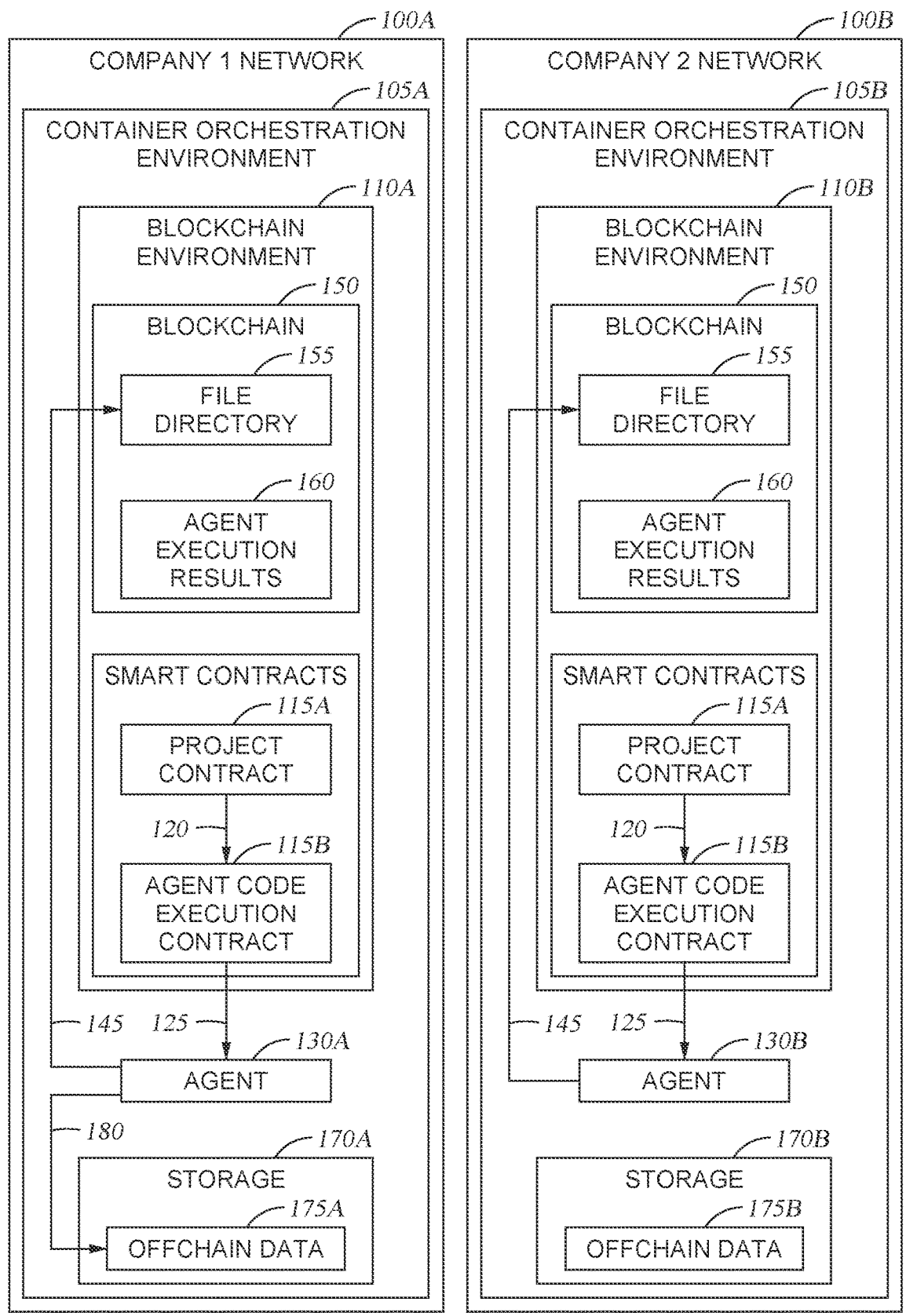

FIG. 3C shows two aspects of performing a search for local data using the agents 130. It is assumed that the file directory 155 returns a location of the requested data that is only stored in the storage 170A in the network 100A. In this case, the agent 130A on the network 100A is permitted to access that location as shown by arrow 180. In contrast, because the agent 130B is on the network 100B, it does not have permission to access the storage 170A on the network 100A. As such, the agent 130A can successfully access the off-chain data indicated by the file directory 155 but the agent 130B cannot. In one aspect, the agent 130B stops executing after determining it cannot access the off-chain data.

Thus, in FIG. 3C, the agent 130B cannot proceed since it failed to access the local data used in the task. However, the agent 130A was able to access the local data. As such, FIGS. 3B and 3C illustrate that two identical agents can be spun up in both networks, but only one may complete the task.

However, in other aspects, the agent code execution contract can be specialized so the agent 130B is not spun up (e.g., only the agent 130A is spun up). Or the contract may spin up the agent 130B so it can load data on the blockchain 150 that is needed by the agent 130A to complete the task, but then the agent 130B stops executing before accessing the file directory since the contract knows the agent 130B will not have access to the local off-chain data stored in the network 100A.

At block 240, the agent performs the task using the local off-chain data and the data retrieved via the blockchain 150 from other organizations (if needed).

At block 245, the agent posts the results of performing the task, or a location of the results, on the blockchain. This is shown by arrows 185 in FIG. 3D where the agents 130 post results in the agent execution results 160. In this example, the agent 130A posts results from performing the task, while the agent 130B may post results indicating that it stopped executing the code once it failed to access the local data. Thus, the organizations can access the results 160 to determine whether the agents 130 executed successfully or if they failed to execute. In the case of the agent 130B, even though it failed, it was expected that it would be unable to successfully complete the task.

Figure 3D:
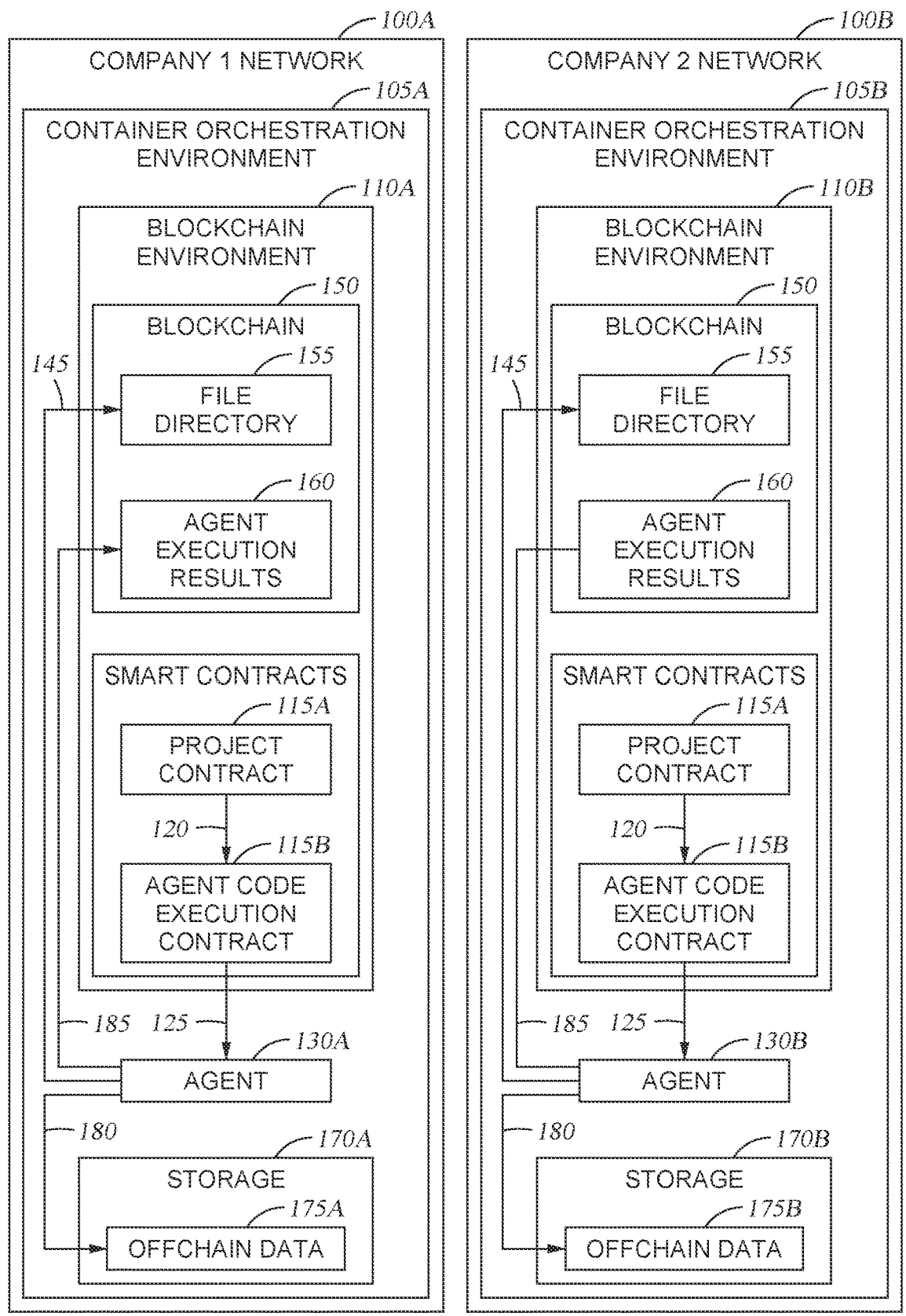
Figure 3E:
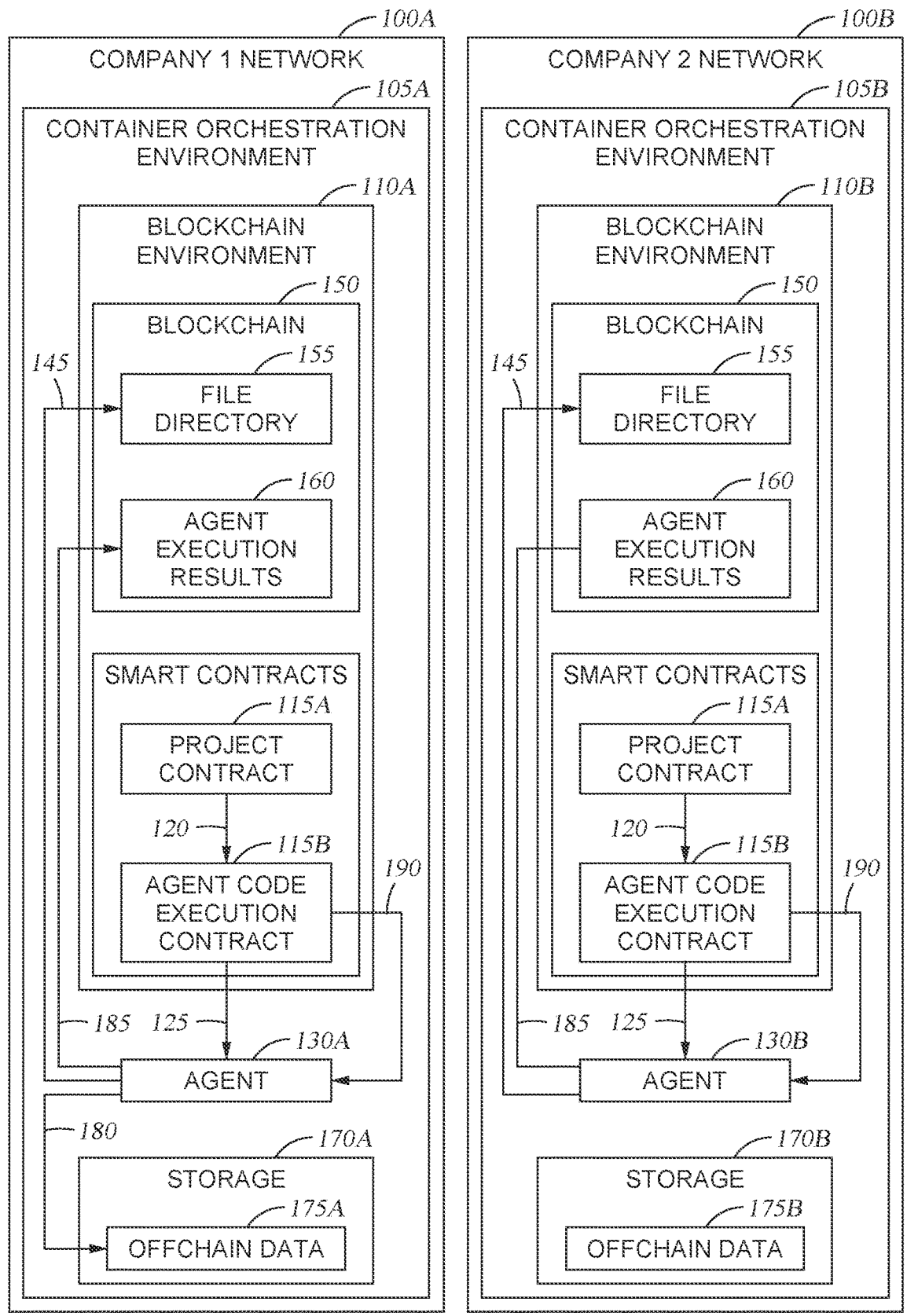

While FIG. 3D illustrates posting the results directly on the blockchain, in another aspect, the agent may post a location of the results on the blockchain. The location may, for example, point to a shared, encrypted storage location that is accessible to the organizations.

At block 250, the agent code execution contract destroys the agent. This is shown by the arrows 190 in FIG. 3E where the agent code execution contract 115B in the network 100A destroys the agent 130A and the agent code execution contract 115B in the network 100B destroys the agent 130B.

Figure 3F:
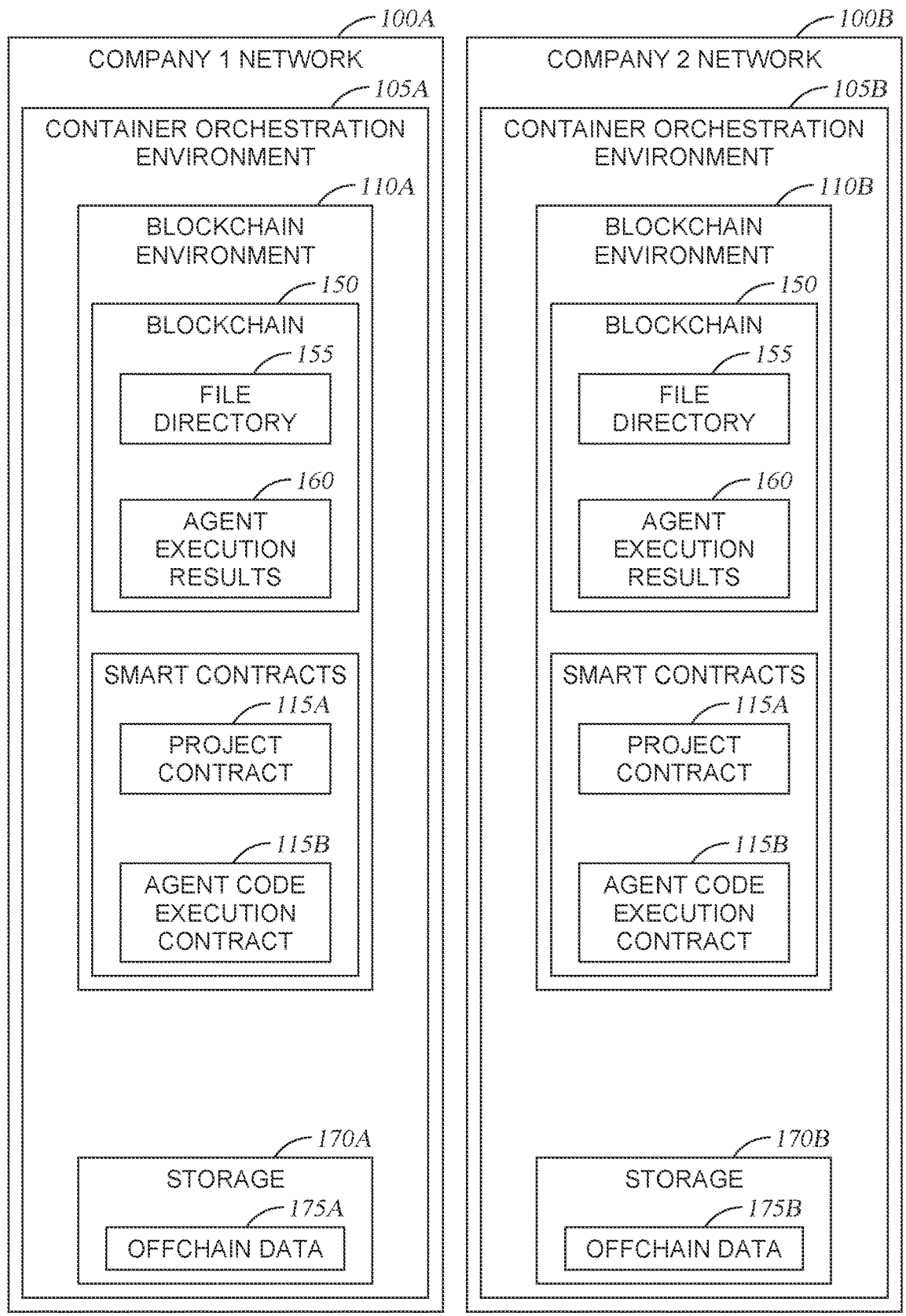

FIG. 3F illustrates the end state of the networks 100A and 100B after the method 200 has completed. As shown, the agents have been removed. Thus, any data that was stored in the containers containing the agents has been deleted. As such, a nefarious actor cannot access the agents. Instead, the results of the task performed by the agent (or agents) is stored in the blockchain, which can be encrypted so that only authorized organizations are able to decrypt the results.

Figure 4:
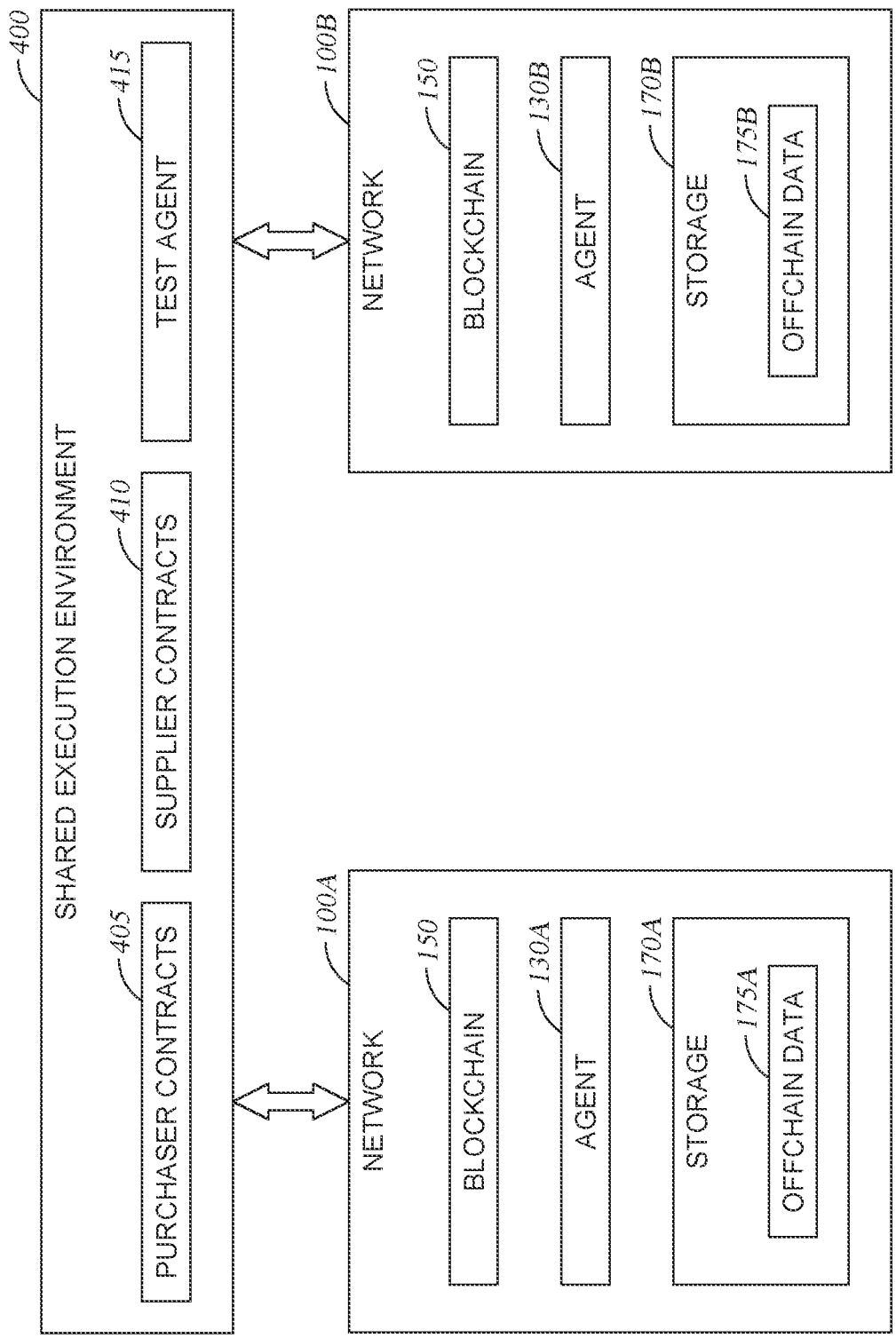
FIG. 4 illustrates using a shared execution environment for enabling secure communication between two organizations, according to one aspect.

FIG. 4 illustrates using a shared execution environment 400 for enabling secure communication between two organizations, according to one aspect. Like in FIGS. 3A-3F, FIG. 4 includes the network 100A for one organization (e.g., a purchaser) and the network 100B for a second organization (e.g., a supplier). Each network 100 includes the same blockchain 150 which can have the information shown in FIG. 1. The network 100A includes the agent 130A and the storage 170A while the network 100B includes the agent 130B and the storage 170B.

In FIG. 4, the networks 100 communicate with the shared execution environment 400. The environment 400 includes purchaser contracts 405 and supplier contracts 410. For example, the purchaser contracts 405 can be tasks that the purchaser who controls the network 100A wants the shared execution environment 400 to perform, while the supplier contracts 410 are the tasks the supplier who controls the network 100B wants the shared execution environment 400 to perform.

The respective agents 130 can provide the data, via the blockchain 150, to a test agent 415 in the shared execution environment 400. For example, the contracts 405 and 410 can provide the instructions and parameters of the tasks performed by the test agent 415. Further, the contracts 405 and 410 can instruct the respective agents 130 what data should be placed on the blockchain 150 so this data can be accessed by the test agent 415. In this manner, the local agents 130 in the networks 100 can provide the data, via the blockchain, to the test agent 415. That way, the local agents 130 control what data the test agent 415 can access. In one aspect, the test agent 415 may be unable to access the local storage 170 on the networks 100, instead relying on the agents 130 to pull what data is needed to perform the contracts 405 and 410 and adding this data to the blockchain 150.

Although not shown, the networks 100 can include the file directory and the agent execution results discussed above. For example, the local agents 130 can use the file directly to access the local storage 170 to retrieve off-chain data 175. The agents 130 may perform an additional step of adding this data to the blockchain 150 so it is also accessible to the test agent 415.

Once the test is complete, the test agent 415 can store the results in the blockchain, as discussed above.

In one aspect, the shared execution environment 400 may destroy the test agent 415 each time the task is complete. That is, when the test agent completes a task defined in one of the contracts 405 and 410, the environment 400 may destroy the test agent so the data stored in the agent container is deleted. Further, the local agents 130 may also be destroyed each time the test agent 415 is destroyed. Put differently, each time the shared execution environment 400 begins to process a new contract, the shared execution environment 400 and the networks 100 may spin up agents which are then destroyed once the contact is complete.

Figure 5:
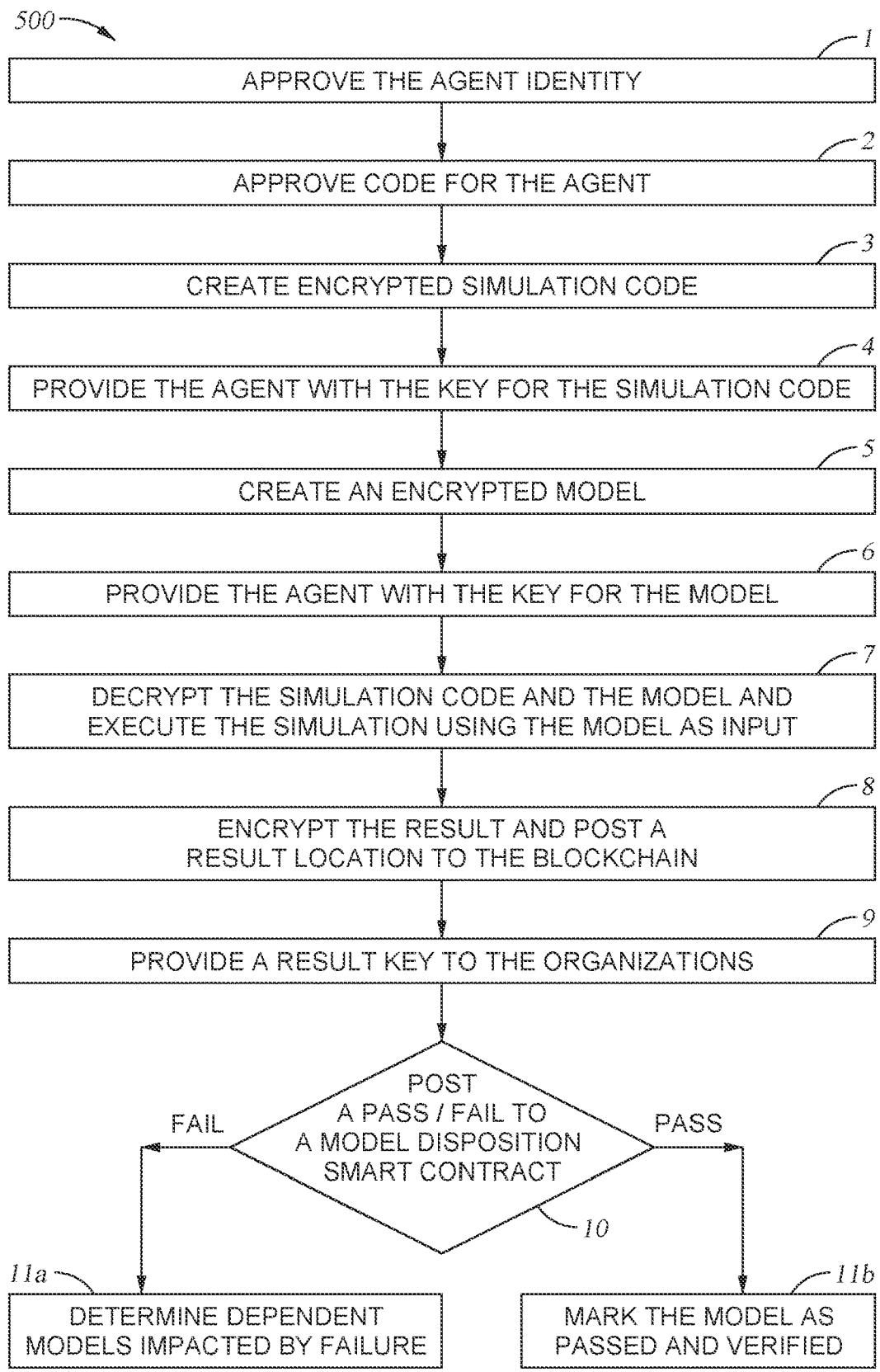
FIG. 5 is a flowchart for enabling secure communication between two organizations using an agent, according to one aspect.

FIG. 5 is a flowchart of a method 500 for enabling secure communication between two organizations using an agent, according to one aspect. For clarity, the method 500 is discussed in tandem with FIG. 6 which depicts a system for performing the flowchart in FIG. 5, according to one aspect. Specifically, the blocks of the method 500 are numbered (1)-(11) which correspond to the labels (1)-(11) in FIG. 6. The method 500 is directed to an agent 130 performing a simulation defined by simulation code 615 provided by Organization 1, where the simulation uses a model 620 provide by Organization 2 as input.

At block (1), Organization 1 and Organization 2 approves the agent identity. This can include policy based permissions.

At block (2), Organization 1 and Organization 2 approves the code for the agent. For example, the Organization 1 and Organization 2 review, sign and approve the code for the agent 130 to perform the secure and private agent functions for the system.

The agent 130 can execute in one (or both) of the networks for the Organizations 1 and 2 as shown in FIG. 3A, or the agent 130 may execute in a shared execution environment as shown in FIG. 4.

At block (3), Organization 1 creates encrypted simulation code 615, which is stored in encrypted data storage 610. In one aspect, Organization 1 encrypts the simulation code 615 with a one-time use key. In one aspect, the simulation code 615 is signed and its content is hashed and its location is posted to the blockchain 150.

Figure 6:
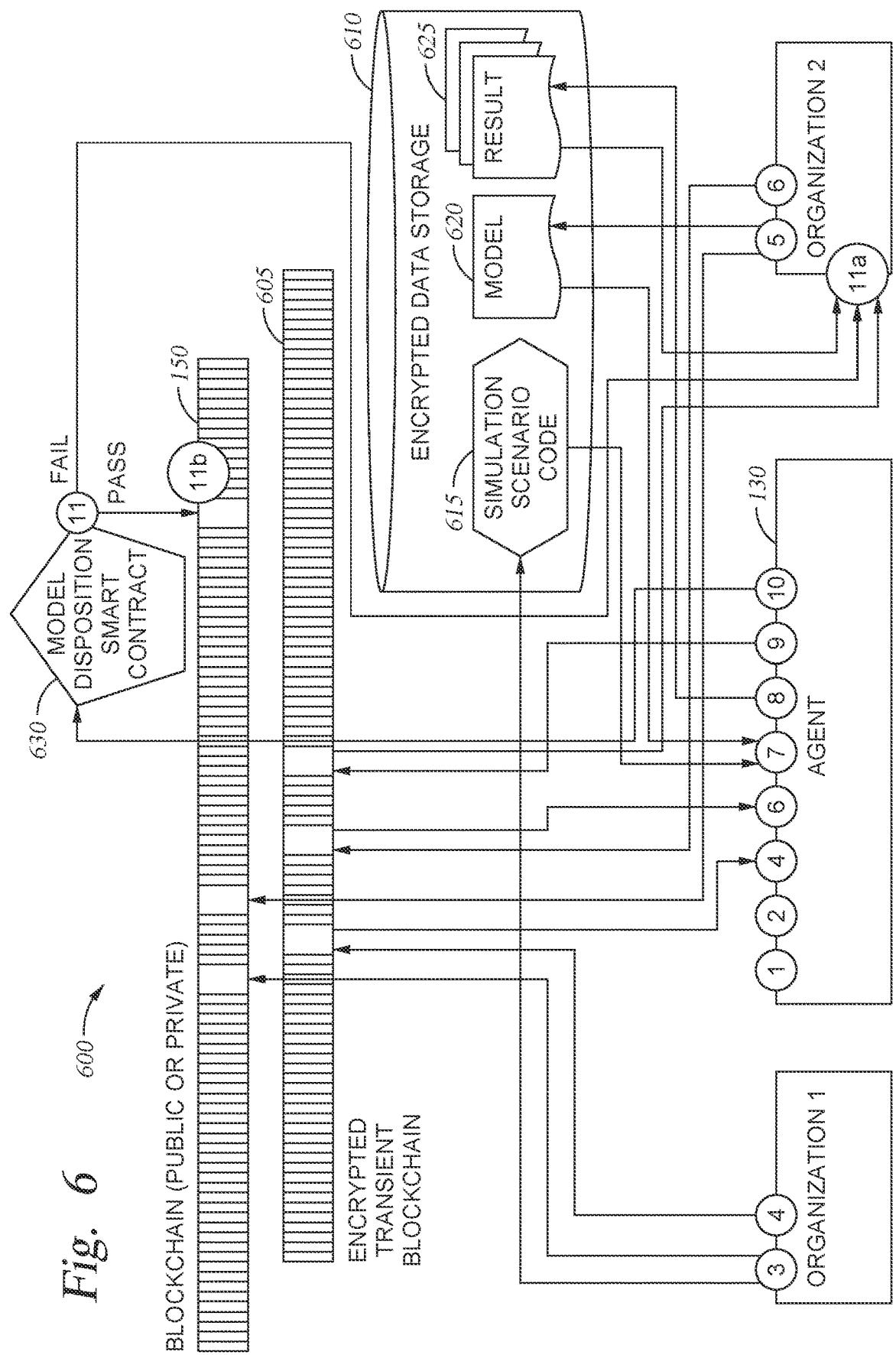
FIG. 6 depicts a system for performing the flowchart in FIG. 5, according to one aspect.

At block (4), Organization 1 provides the agent with the key for the simulation code. In FIG. 6, Organization 1 provides the key to the agent using the encrypted transient blockchain 605 (or ledger). That is, the blockchain 605 may be a separate blockchain from the blockchain 150 which is used to store transient keys posted by the Organizations 1 and 2 and the agent 130.

At block (5), Organization 2 creates an encrypted model 620. In one aspect, Organization 2 encrypts the model 620 with a one-time use key. Organization 2 may also sign the model 620. The contents of the model 620 can be hashed and a location of the model can be posted to the blockchain 150. In this example, the model 620 is stored in encrypted data storage 610.

At block (6), Organization 2 provides the agent 130 with the key for the model 620. FIG. 6 illustrates that this can be accomplished using the encrypted transient blockchain 605.

At block (7), the agent 130 decrypts the simulation code 615 and the model 620 and executes the simulation using the model 620 as input. In one aspect, the agent 130 also verifies the integrity of the simulation code 615 and the model 620 before executing the simulation.

At block (8), the agent 130 encrypts the results 625 of performing the simulation and posts a location of the results 625 to the blockchain 150. That is, the location on the blockchain 150 can indicate the results 625 are stored in the data storage 610.

At block (9), the agent 130 provides a result key to the organizations. In FIG. 6, the agent 130 posts the result key for decrypting the results 625 to the transient blockchain 605, so this key can be retrieved by the Organizations 1 and 2.

At block (10), the agent 130 posts a pass/fail to a model disposition smart contract 630. The post can reference the model 620 which was used as an input in block (5) and the results 625. The model disposition smart contract 630 can then retrieve, decrypt, and analyze the results 625 to determine whether the simulation failed or passed.

If the test failed, the method 500 proceeds to block (11a) where the model disposition smart contract 630 determines the dependent models impacted by the failure. The contract 630 can posts a notification event to the owners of the dependent models. Because Organization 2 has a model affected by the failure, Organization 2 retrieves the results, decrypts it, extracts change recommendation for implementation of the correction (e.g., an adjustment in x-y-z planes for structure fitment). The method 500 can return to block (5) to repeat but this time using an updated model provided by the Organization 2 (and any other organizations that had dependent models). The method 500 can repeat as often as necessary until the input model provided by Organization 2 passes the simulation code provided by Organization 1.

If the test passed, the method 500 proceeds to block (11b) where the model disposition smart contract 630 marks the model as passed and verified.

Some non-limiting advantages of the aspects above include (i) creating and maintaining a shared state of ownership, status and change history across a network of a multitude of enterprise organizations for design models with near real-time updates, (ii) providing change notifications and automated actions across a multitude of enterprise organizations and their independently owned and operated systems, (iii) providing an automated and secured mechanism to transfer ownership of design models and associated digital artifacts, (iv) providing an automated means to validate the conformance of a model to design constraints without exposure of the model to the validating organization or other participants of the network, (v) tracking dependencies between design models across a multitude of enterprise organizations and calculating impacts of changes through the dependency hierarchy, (vi) providing a baseline model representation schema and a catalog of model transformations which allow for automated agents to process validation rules against models created in different formats by different computer aided design tools, (vii) executing validation rules and provides feedback on specific necessary adjustments to the target model that are needed to bring it into conformance with design constraints where the validation rule determines structural mating point conformance of the proposed model to design requirement and provides correction in x-y-z planes in relation to center lines in the returned result, (viii) protecting intellectual property of model owners from leaking sensitive information while allowing near real-time collaboration across a multitude of independent enterprise organizations, and (ix) retaining a public record, within the permissioned network of participants, of the validation and change history through the entire model lifecycle that is retained in an immutable, consistent, automatic and immediate method which supports transfer of ownership and auditability.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method comprising:
   creating an agent in a container environment on a network of a first organization of at least two organizations,
   wherein the container environment includes local storage and a blockchain environment,
   wherein the blockchain environment is shared by the at least two organizations and includes a blockchain shared by the at least two organizations, and
   wherein the agent is created outside of the blockchain environment based on a smart contract, shared by the at least two organizations, that defines a task for the agent to perform on behalf of the at least two organizations;
   determining whether a data set to perform the task, indicated by a file directory on the blockchain, includes data from a second organization of the at least two organizations;
   retrieving the data set based on the determination,
   wherein the data from the second organization is retrieved via the blockchain and data from the first organization is retrieved via the local storage;
   performing the task by the agent using the data set;
   posting, by the agent, results of performing the task, or a location of the results, on the blockchain; and
   destroying the agent.

2. The method of claim 1, further comprising:
   creating a project contract defining the task, wherein the project contract is negotiated by the two organizations and indicates data required by the at least two organizations to complete the task, and wherein the smart contract is generated using the project contract and the smart contract comprises software code for the agent.

3. The method of claim 1, wherein one of the first organization or the second organization provides simulation code to the agent and the other of the first organization or the second organization provides a model to the agent, wherein performing the task comprises:
   executing, by the agent, the simulation code using the model as an input.

4. The method of claim 3, wherein the simulation code and the model are encrypted, the method further comprising:
   providing keys to the agent using a second blockchain to decrypt the simulation code and the model.

5. The method of claim 4, wherein the results of performing the task are encrypted, the method further comprising:
   providing a key to the at least two organizations for decrypting the results using the second blockchain.

6. The method of claim 3, further comprising:
   upon determining the model failed the simulation code, determining at least one dependent model impacted by the failure; and
   posting a notification event to an owner of the at least one dependent model.

7. The method of claim 1, wherein retrieving the data set further comprises:
   retrieving a first portion of the data set, or a location of the first portion of the data set, from the blockchain that was posted by a second agent executing on a network of the second organization; and
   retrieving a second portion of the data set from the local storage.

8. The method of claim 1, wherein the container environment is not accessible to a user.

9. The method of claim 1, wherein the agent is not able to access a network of the second organization.

10. A system comprising:
a processor; and
memory storing an application, which when executing by the processor performs an operation, the operation comprising:
creating an agent in a container environment on a network of a first organization of at least two organizations,
wherein the container environment includes local storage and a blockchain environment,
wherein the blockchain environment is shared by the at least two organizations and includes a blockchain shared by the at least two organizations, and
wherein the agent is created outside of the blockchain environment based on a smart contract, shared by the at least two organizations, that defines a task for the agent to perform on behalf of the at least two organizations;
determining whether a data set to perform the task, indicated by a file directory on the blockchain, includes data from a second organization of the at least two organizations;
retrieving the data set based on the determination,
wherein data from the second organization is retrieved via the blockchain and data from the first organization is retrieved via the local storage;
performing the task by the agent using the data set;
posting, by the agent, results of performing the task, or a location of the results, on the blockchain; and
destroying the agent.

11. The system of claim 10, wherein the operation further comprises:
creating a project contract defining the task, wherein the project contract is negotiated by the two organizations and indicates data required by the at least two organizations to complete the task, and wherein the smart contract is generated using the project contract and the smart contract comprises software code for the agent.

12. The system of claim 10, wherein one of the first organization or the second organization provides simulation code to the agent and the other of the first organization or the second organization provides a model to the agent, wherein performing the task comprises:
executing, by the agent, the simulation code using the model as an input.

13. The system of claim 12, wherein the simulation code and the model are encrypted, the operation further comprises:
providing keys to the agent using a second blockchain to decrypt the simulation code and the model.

14. The system of claim 13, wherein the results of performing the task are encrypted, the operation further comprises:
providing a key to the at least two organizations for decrypting the results using the second blockchain.

15. The system of claim 13, wherein the operation further comprises:
upon determining the model failed the simulation code, determining at least one dependent model impacted by the failure; and
posting a notification event to an owner of the at least one dependent model.

16. The system of claim 10, wherein retrieving the data set further comprises:
retrieving a first portion of the data set, or a location of the first portion of the data set, from the blockchain that was posted by a second agent executing on a network of the second organization; and
retrieving a second portion of the data set from the local storage.

17. A non-transitory computer-readable medium encoding instructions, which, when executed by a processor perform an operation, the operation comprising:
creating an agent in a container environment on a network of a first organization of at least two organizations,
wherein the container environment includes local storage and a blockchain environment,
wherein the blockchain environment is shared by the at least two organizations and includes a blockchain shared by the at least two organizations, and
wherein the agent is created outside of the blockchain environment based on a smart contract, shared by the at least two organizations, that defines a task for the agent to perform on behalf of the at least two organizations;
determining whether a data set to perform the task, indicated by a file directory on the blockchain, includes data from a second organization of the at least two organizations;
retrieving the data set based on the determination,
wherein data from the second organization is retrieved via the blockchain and data from the first organization is retrieved via the local storage;
performing the task by the agent using the data set;
posting, by the agent, results of performing the task, or a location of the results, on the blockchain; and
destroying the agent.

18. The computer-readable medium of claim 17, wherein the operation further comprises:
creating a project contract defining the task, wherein the project contract is negotiated by the two organizations and indicates data required by the at least two organizations to complete the task, and wherein the smart contract is generated using the project contract and the smart contract comprises software code for the agent.

19. The computer-readable medium of claim 17, wherein one of the first organization or the second organization provides simulation code to the agent and the other of the first organization or the second organization provides a model to the agent, wherein performing the task comprises:
executing, by the agent, the simulation code using the model as an input.

20. The computer-readable medium of claim 19, wherein the simulation code and the model are encrypted, the operation further comprises:
providing keys to the agent using a second blockchain to decrypt the simulation code and the model.

* * * * *